United States Patent
Khosrowshahi et al.

(10) Patent No.: US 6,766,512 B1
(45) Date of Patent: Jul. 20, 2004

(54) METHODS AND SYSTEMS FOR GENERATING A STRUCTURED LANGUAGE MODEL FROM A SPREADSHEET MODEL

(75) Inventors: Farzad Khosrowshahi, Pleasantville, NY (US); Murray I. Woloshin, New York, NY (US)

(73) Assignee: FurrayLogic Ltd., New York, NY (US)

( * ) Notice: Subject to any disclaimer, the term of this patent is extended or adjusted under 35 U.S.C. 154(b) by 394 days.

(21) Appl. No.: 09/718,781

(22) Filed: Nov. 22, 2000

(51) Int. Cl.[7] ............................................. G06F 9/45
(52) U.S. Cl. ...................................... 717/140; 707/504
(58) Field of Search ................................ 717/136–144; 707/10, 104.1, 503–504, 526; 709/200–203; 345/751

(56) References Cited

U.S. PATENT DOCUMENTS

| | | | | |
|---|---|---|---|---|
| 5,471,612 A | * | 11/1995 | Schlafly | 715/503 |
| 5,600,584 A | * | 2/1997 | Schlafly | 708/551 |
| 6,281,874 B1 | * | 8/2001 | Sivan et al. | 345/660 |
| 6,694,309 B2 | * | 2/2004 | Cho et al. | 707/3 |

* cited by examiner

*Primary Examiner*—Wei Y. Zhen
*Assistant Examiner*—Lawrence Shrader
(74) *Attorney, Agent, or Firm*—Steven Horowitz

(57) ABSTRACT

In one embodiment of the present invention, there is provided a method for easily allowing a user of little to no programming language knowledge to convert a computerized spreadsheet model to a structured programming language model, which method includes: (i) receiving, from the user via a computer input device, outputs and inputs of the computerized spreadsheet model desired to be processed for conversion; (ii) checking the user entries for errors; (iii) if an error is found, then requesting corrected user entry; (iv) if no error is found, then identifying all relevant spreadsheet model cells based on the user entries; (v) processing formulas used in the spreadsheet model for parsing; (vi) converting the formulas into final form and determining calculation priority order; and (vii) generating the structured programming language model. The method of the present invention is carried out by a system including a computer having a user interface, a microprocessor and a storage unit, an input device electronically coupled to the computer, and a software program stored in the storage unit, the software program being programmed to operate the microprocessor for carrying out the steps of the invention.

27 Claims, 2 Drawing Sheets

FIG. 1

| | A | B | C | D | E | F | G | H | I |
|---|---|---|---|---|---|---|---|---|---|
| 1 | Inputs | | | | | | | Outputs | |
| 2 | State Tax Rate: | 12% | | Period | EBITDA | Free CFL | | PV of Cashflows: | 24,359 |
| 3 | Fed Tax Rate: | 30% | | 2000 | 10,000 | 5,800 | | Sum of Cashflows: | 30,160 |
| 4 | Total Tax Rate: | 42% | | 2001 | 18,000 | 10,440 | | NPV of Investment: | 9,359 |
| 5 | | | | 2002 | 24,000 | 13,920 | | | |
| 6 | Base Year: | 2000 | | | | | | | |
| 7 | Discount Rate: | 10% | | | | | | | |
| 8 | Initial Investment: | 15,000 | | | | | | | |

FIG. 2

| | A | B | C | D | E | F | G | H | I |
|---|---|---|---|---|---|---|---|---|---|
| 1 | Inputs | | | | | | | Outputs | |
| 2 | State Tax Rate: | 12% | | Period | EBITDA | Free CFL | | PV of Cashflows: | =NPV(B7,F2:F4) |
| 3 | Fed Tax Rate: | 30% | | =B6 | 10,000 | =E2*(1-$B$4) | | Sum of Cashflows: | =SUM(F2:F4) |
| 4 | Total Tax Rate: | =B2+B3 | | =+D2+1 | 18,000 | =E3*(1-$B$4) | | NPV of Investment: | =I2-B8 |
| 5 | | | | =+D3+1 | 24,000 | =E4*(1-$B$4) | | | |
| 6 | Base Year: | 2000 | | | | | | | |
| 7 | Discount Rate: | 10% | | | | | | | |
| 8 | Initial Investment: | 15,000 | | | | | | | |

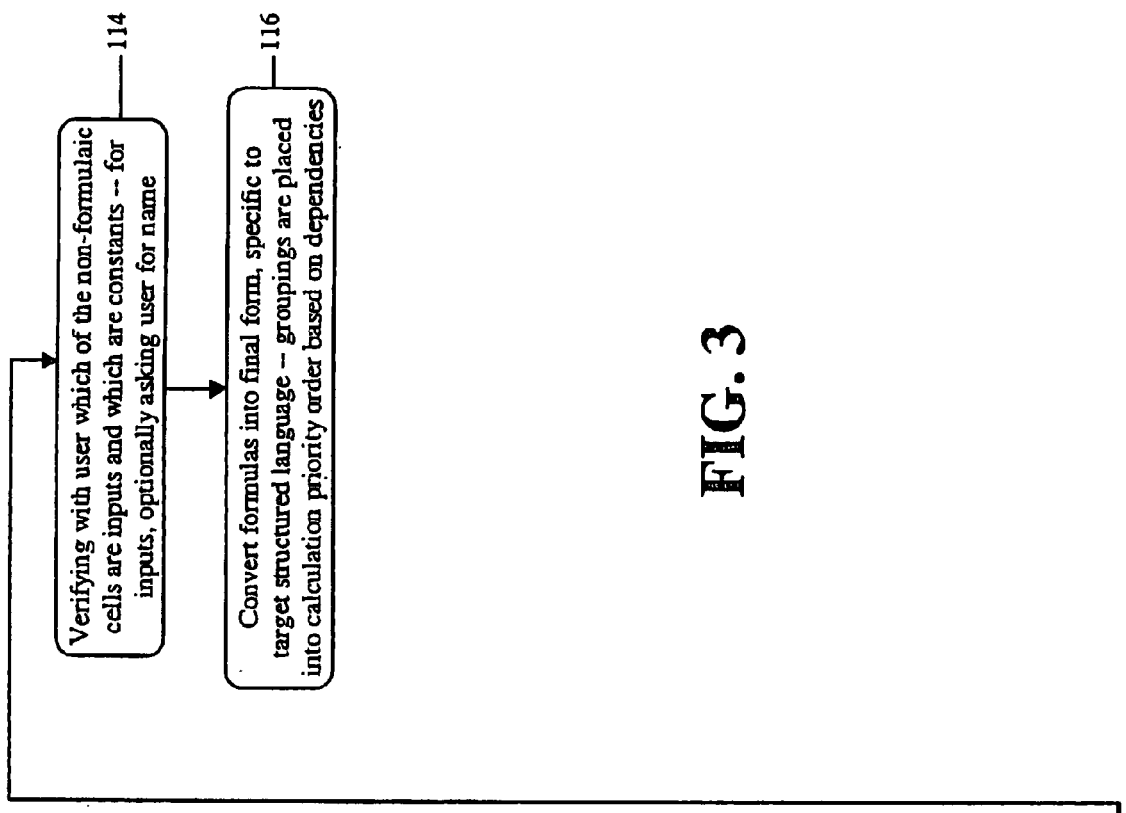
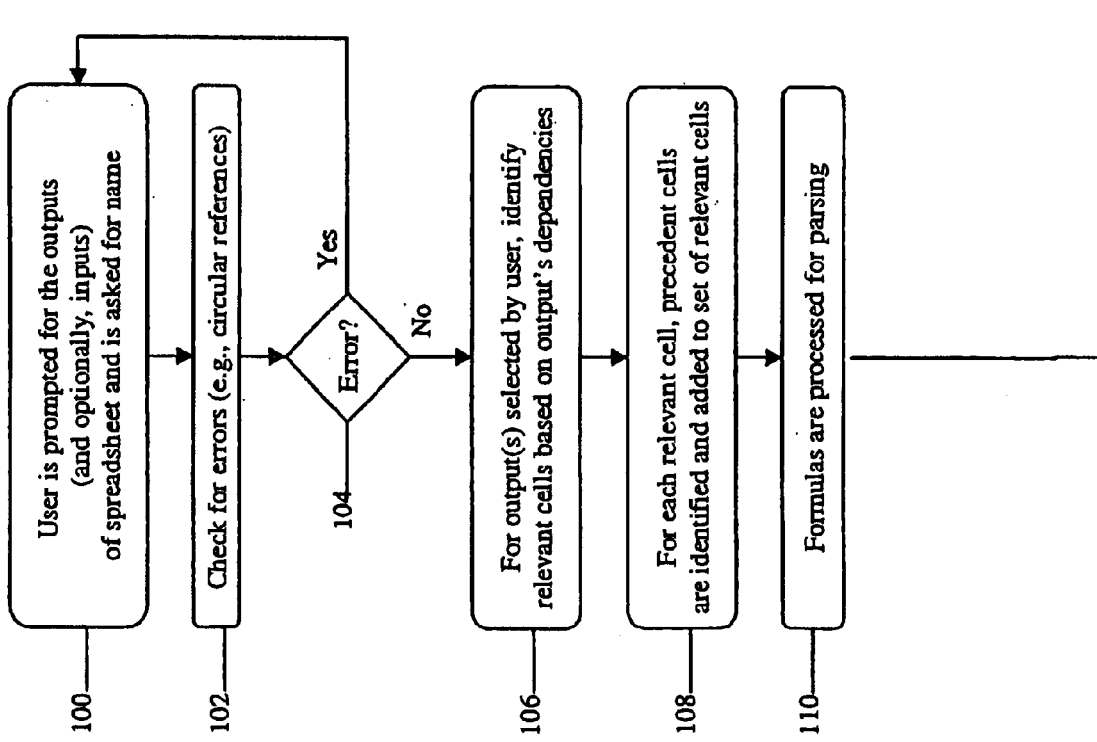
FIG. 3

METHODS AND SYSTEMS FOR GENERATING A STRUCTURED LANGUAGE MODEL FROM A SPREADSHEET MODEL

BACKGROUND OF THE INVENTION

Computerized spreadsheets, such as provided by Microsoft Corporation's Excel software product or Lotus Development Corporation's Lotus 1-2-3, have gained widespread use. Individuals and businesses routinely use computerized spreadsheets for a variety of purposes, such as accounting, finance and investments.

Generally, a spreadsheet is made up of rows and columns of individual cells. In Microsoft's Excel, for example, each row is identified by a number and each column is identified by a letter. Thus, "D5" is identified as the cell in column D and row 5.

A user may enter a number or text into an individual cell. In addition, computerized spreadsheets allow users to define mathematical functions or formulas within individual cells. Formulas can refer to other cells. For example, as provided in the Help section of Microsoft Excel, a cell may contain the following formula:

"=(B4+25)/SUM(D5:F5)"

This formula adds the value in cell B4 with 25, then divides the result by the sum of cells D5, E5 and F5. A formula, in Microsoft Excel, begins with an equal sign, followed by what the formula calculates.

For people working in finance, investment, accounting, engineering or the like, computerized spreadsheets are essential tools. Employees of the assignee of the present invention—JP Morgan & Co. Inc.—for example, often use computerized spreadsheets to develop and create financial products which are marketed to potential and existing clients. There are disadvantages and shortcomings that are encountered by such users. These include: the models may not be transferable from one computer to another unless the receiving computer has the same spreadsheet software product, i.e., a spreadsheet model developed using one computerized spreadsheet program may not operate on another spreadsheet program; models cannot be provided to a client or a potential client without exposing the proprietary mathematical logic of the models; computerized spreadsheets may suffer from slow executions; computerized spreadsheets have limited security and version control; computerized spreadsheets may not easily be interfaced with other systems or programs; and the user is limited to the graphical user interface provided by the computerized spreadsheet program when presenting the spreadsheet model to a client/potential client.

What is desired, therefore, is a method and system that overcomes the disadvantages and shortcomings described above. More specifically, what is desired is a method and system for generating a structured language model, such as in C or Java code, from a spreadsheet model that overcomes the disadvantages and shortcomings described above.

SUMMARY OF THE INVENTION

In one embodiment of the present invention, there is provided a method for easily allowing a user of little to no programming language knowledge to convert a computerized spreadsheet model to a structured programming language model, which method includes:

receiving, from the user via a computer input device, outputs and inputs of the computerized spreadsheet model desired to be processed for conversion;

checking the user entries for errors;

if an error is found, then requesting corrected user entry;

if no error is found, then identifying all relevant spreadsheet model cells based on the user entries;

processing formulas used in the spreadsheet model for parsing;

converting the formulas into final form and determining calculation priority order; and generating the structured programming language model.

The method of the present invention is carried out by a system including a computer having a user interface, a microprocessor and a storage unit, an input device electronically coupled to the computer, and a software program stored in the storage unit, the software program being programmed to operate the microprocessor for carrying out the steps of the invention.

BRIEF DESCRIPTION OF THE DRAWINGS

FIG. 1 shows an exemplary spreadsheet model from which a structured programming language model is to be generated;

FIG. 2 shows the spreadsheet model of FIG. 1, with the formulas employed in the model disclosed; and FIG. 3 shows a flow chart illustrating the steps for generating a structured programming language model from the spreadsheet model of FIGS. 1 and 2.

DETAILED DESCRIPTION OF THE PREFERRED EMBODIMENT

FIG. 1 is an example of a spreadsheet model 10 from which a structured language model is to be generated. For exemplary purposes, the spreadsheet model was developed using Microsoft Excel and the structured language model to be generated is in Java code. It should be apparent to one of ordinary skill in the art that a structured language model may also be generated from spreadsheet models developed using other software products, such as Lotus 1-2-3, without departing from the scope or the spirit of the invention. Also, it should be apparent to one of ordinary skill in the art that different structured language models, such as in C code, may be generated from a spreadsheet model pursuant to the scope and the spirit of the invention as described and claimed herein.

In the spreadsheet model 10 of FIG. 1, cell B2, identified by reference numeral 20, contains a value for the state tax rate—12% in this example, cell B3, identified by reference numeral 22, contains a value for the federal tax rate—30%, and cell B4, identified by reference numeral 24, contains a value for the total tax rate—42%. Cell B6, identified by reference numeral 26, contains the base year—2000, cell B7, identified by reference numeral 28, contains a value for the discount rate—10%, and cell B8, identified by reference numeral 30, contains a value for the initial investment—15, 000.

In addition to the six inputs identified above, the spreadsheet model 10 includes a column labeled "Period," with cells D2, D3 and D4, identified by reference numerals 32, 34, 36, respectively, containing the base year—2000 and the following two years—2001, 2002. The column labeled "EBITDA" includes three cells, E2, E3 and E4, identified by reference numerals 38, 40, 42, respectively, containing values 10,000, 18,000 and 24,000. EBITDA stands for earnings before interest, taxes, depreciation and amortization. The column labeled "Free CFL" includes three cells F2, F3 and F4, identified by reference numerals 44, 46, 48, respectively, containing values 5,800, 10,440 and 13,920. Free CFL stands for free cash flow, which is defined as operating cash flow (net income plus amortization and depreciation) minus capital expenditures and dividends.

The exemplary spreadsheet model 10 of FIG. 1 also includes three outputs. Cell 12, identified by reference numeral 50, contains a value for the present value ("PV") of cash flows—24,359, cell I3, identified by reference numeral 52, contains a value for the sum of the cash flows—30,160, and cell 14, identified by reference numeral 54, contains a value for the net present value ("NPV") of the investment—9,359. Present value of cash flows is the current value of one or more future cash payments discounted at some appropriate interest rate. Net present value is the present value of an investment's future net cash flows minus the initial investment.

FIG. 2 shows the spreadsheet model 10 of FIG. 1, with the formulas employed in the model revealed. The value for the total tax rate in cell B4 is calculated from adding the value for the state tax rate in cell B2 and the value for the federal tax rate in cell B3. All the other inputs are values entered by the user. The values for periods in cells D2, D3 and D4 are derived from the base year in cell B6, base year plus 1, and base year plus 1 plus 1, respectively. EBITDA values are entered by the user.

Free CFL values in cells F2, F3 and F4 are calculated as follows: cell F2 value is calculated by subtracting the total tax rate in cell B4 (0.42) from 1 to get 0.58, then multiplying this result with the EBITDA value in cell E2 (10,000) to get 5,800; cell F3 value is calculated by subtracting the total tax rate in cell B4 from 1 to get 0.58, then multiplying this result with the EBITDA value in cell E3 (18,000) to get 10,440; and cell F4 value is calculated by subtracting the total tax rate in cell B4 from 1 to get 0.58, then multiplying this result with the EBITDA value in cell E4 (24,000) to get 13,920.

The outputs in the exemplary spreadsheet model 10 are calculated as follows: The PV of cash flows, cell 12, is calculated by the NPV function of Microsoft Excel, using the value of the discount rate in cell B7 and the cash flow values in cells F2, F3 and F4. The sum of cash flows, cell I3, is calculated by the SUM function of Microsoft Excel, adding the cash flow values in cells F2, F3 and F4. And the NPV of investment, cell I4, is calculated by subtracting the initial investment value in cell B8 from the calculated PV of cash flows in cell I2.

FIG. 3 is a flow chart illustrating the steps of the present invention for generating a structured language model from a spreadsheet model, such as the Excel spreadsheet model 10 of FIGS. 1 and 2. At step 100, the user is prompted for the outputs of the spreadsheet model that he desires and preferably, also the name that he wants to use for the model. Optionally, the user may also be prompted to select display formatting parameters and/or the inputs of the spreadsheet model. While the following description is based on receiving only the output selections from the user, the system of the present invention may be modified in a manner apparent to one of ordinary skill in the art to receive input selections from the user as well. After receiving the user entries, the system, at step 102, checks for errors in the user entries. If the system detects an error at step 104, then the system returns to step 100 with an appropriate error message. Note that depending upon how the user is prompted for entries from the spreadsheet, this error checking step may not be required.

If no error is detected, then at step 106, the system identifies relevant spreadsheet cells based on dependencies of the selected outputs. For example, if a selected output has the following formula, =SUM(A1:A3), then the system will identify cells A1, A2 and A3 as being relevant. At step 108, for each relevant cell identified, precedent cells are identified and added to set of relevant cells. For example, let's assume that cell A2 is dependent on sum of the values in cells B3 and B4. In this case, cells B3 and B4 will be added to the set of relevant cells.

At step 110, the formulas used in the spreadsheet model are processed for parsing. This step prepares the spreadsheet formulas for conversion to the structured language model. At step 114, the user is asked to verify which of the non-formulaic cells are inputs and which are constants. For those cells that are inputs, the user is optionally requested to enter desired names for the inputs. Note that this step could be optionally carried out at step 100, as described above. Finally, at step 116, the system converts the formulas into final form, specific to the desired structured language, and relevant cells are placed into calculation priority based on the dependencies. The system then generates the structured language model.

To further illustrate the steps of FIG. 3, we will look at the conversion of the exemplary spreadsheet model 10 in FIGS. 1 and 2 into a model in Java code. It should be apparent to one of ordinary skill in the art that the details set forth herein are only one way of converting a spreadsheet model to a model in Java code and that other ways of converting a spreadsheet model may be utilized without departing from the spirit and scope of the invention.

The user is prompted for the outputs of the spreadsheet he desires and is asked to provide a name for the Java class. As described above with respect to step 100 of FIG. 3, the user may also be prompted to select the inputs of the spreadsheet model. In this example, let's assume the user selects cells I2 and I4 as the desired outputs, selects the name "Patent" as the Java class name and selects the display format (note that the display format is for a Java servlet that may call the structured language model generated pursuant to the present invention). The system then checks for errors. If an error is detected, then the system provides an appropriate error message and requests the user to correct the user entry.

If no error is detected, then the system places the selected output cells onto a Formula Stack. Such a Stack may look as follows:

Formula Stack

| Cell | Formula | Input/Output Parent |
|---|---|---|
| [Pat04.xls]Demo!I2 | NPV(B7,F2:F4) | _Bk1Wk1I2I2 |
| [Pat04.xls]Demo!I4 | I2-B8 | _Bk1Wk1I4I4 |

The "Input/Output Parent" column in the Formula Stack corresponds to the following Output Parent Stack determined by the system:

Output Parent Stack

| Name | Output Parent Range |
|---|---|
| _Bk1Wk1I2I2 | [Pat04.xls]Demo!I2 |
| _Bk1Wk1I4I4 | [Pat04.xls]Demo!I4 |

The names used in the Output Parent Stack have no special significance. Bk1 stands for workbook 1 (in case more than one workbook is used) and Wk1 stands for worksheet 1 (in case more than one worksheet is used). Note that for the output cells I2 and I4, the Parent Range is only the individual output cell. This is because the user did not select cell I3 as a desired output in the example. Had cell I3 been selected as well, then the Parent Range would have been I2:I4.

The cell names in the Formula Stack table above do not have any significance, other than to simply represent the appropriate cell of the spreadsheet model. The system goes through the Formula Stack to identify relevant cells based on the selected outputs' dependencies. For each output, all precedent cells are identified and unique precedent cells are placed onto the Formula Stack. That is, the system makes sure to only place new precedent cells on the Stack—if a precedent cell is already on the Stack, it is not placed again. In our example, cells B7, F2, F3 and F4 are placed on the Formula Stack for output cell I2. And cell B8 is placed on the Formula Stack for output cell I4. In the embodiment herein, the precedents are placed in a comma delimited format into the "Precedents" column.

For each unique precedent cell, the system identifies relevant cells based on its dependencies. Thus, for F2, relevant cells E2 and B4 are identified and placed on the Stack. For F3, relevant cells E3 and B4 are identified, and E3 is placed on the Stack (note that B4 is not placed on the Stack because it has already been placed on the Stack for F2). For F4, relevant cells E4 and B4 are identified, and E4 is placed on the Stack. For B4, relevant cells B2 and B3 are identified and placed on the Formula Stack.

In addition to adding precedent cells to the Formula Stack, the formulas are processed for parsing. In our example, the "#@" and "@#" characters are used as markers to break down the formulas for easy future parsing. It should be noted that there is no significance in the choice of the "#@" and "@#" characters as markers. Alternatively, the system may process formulas as the formulas are encountered. Optionally, the system may convert all ^'s to the xPow function, e.g., the formula 2^3 becomes xPow(2,3), and the system may wrap formula array functions inside the xArray function. For example, {SUM(IF(Y2:Y3,1,0))} becomes xArray(SUM(IF(#@Y2:Y3@#,1,0)),1) for cell Y2 and
xArray(SUM(IF(#@Y2:Y3@#,1,0)),2) for cell Y3. Here is how the Stack looks at this point:

| Cell | Formula | Precedents | Input/Output Parent |
|---|---|---|---|
| [Pat04.xls]Demo!I2 | NPV(#@B7@#,#@F2:F4@#) | B7,F2:F4 | _Bk1Wk1I2I2 |
| [Pat04.xls]Demo!I4 | #@I2@#-#@B8@# | I2,B8 | _Bk1Wk1I4I4 |
| [Pat04.xls]Demo!B7 | 0.1 | | |
| [Pat04.xls]Demo!F2 | #@E2@#*(1-#@$B$4@#) | E2,B4 | |
| [Pat04.xls]Demo!F3 | #@E3@#*(1-#@$B$4@#) | E3,B4 | |
| [Pat04.xls]Demo!F4 | #@E4@#*(1-#@$B$4@#) | E4,B4 | |
| [Pat04.xls]Demo!B8 | 15000 | | |
| [Pat04.xls]Demo!E2 | 10000 | | |
| [Pat04.xls]Demo!E3 | 18000 | | |
| [Pat04.xls]Demo!E4 | 24000 | | |
| [Pat04.xls]Demo!B4 | #@B2@#+#@B3@# | B2,B3 | |
| [Pat04.xls]Demo!B2 | 0.12 | | |
| [Pat04.xls]Demo!B3 | 0.3 | | |

At this point, the system in this example fills in the Main Parent column and the Main Parent Stack. Also, the system determines the Input Parent Stack and fills in the Input/Output Parent column of the Formula Stack accordingly. The Parent Stacks indicate which cells are adjacent to each other and will therefore be part of the same variable. Part of the reason for the Parent Stacks is to avoid allocating new memory in processing. The Parent Ranges can be determined using various techniques, e.g., recursion. For example, the system can search through the Formula Stack recursively to determine what other cells/inputs are adjacent and mark them as belonging to the same Parent Range. It should be noted that as used in this embodiment, Parent Ranges are rectangular. Therefore, not all the cells in the range may be used and/or displayed. Also, the Main Parent for a particular row may be the same as the Input/Output Parent, but it will not be smaller. In our example, the Formula Stack, the Main Parent Stack and the Input Parent Stack look as follows after this step:

Formula Stack

| Cell | Formula | Precedents | Main Parent | Input/Output Parent |
|---|---|---|---|---|
| [Pat04.xls]Demo!I2 | NPV(#@B7@#,#@F2:F4@#) | B7,F2:F4 | _Bk1Wk1I2I2 | _Bk1Wk1I2I2 |
| [Pat04.xls]Demo!I4 | #@I2@#-#@B8@# | I2,B8 | _Bk1Wk1I4I4 | _Bk1Wk1I4I4 |
| [Pat04.xls]Demo!B7 | 0.1 | | _Bk1Wk1B7B8 | _Bk1Wk1B7B8 |
| [Pat04.xls]Demo!F2 | #@E2@#*(1-#@$B$4@#) | E2,B4 | _Bk1Wk1E2F4 | |
| [Pat04.xls]Demo!F3 | #@E3@#*(1-#@$B$4@#) | E3,B4 | _Bk1Wk1E2F4 | |
| [Pat04.xls]Demo!F4 | #@E4@#*(1-#@$B$4@#) | E4,B4 | _Bk1Wk1E2F4 | |

-continued

| Cell | Formula | Precedents | Main Parent | Input/Output Parent |
|---|---|---|---|---|
| [Pat04.xls]Demo!B8 | 15000 | | _Bk1Wk1B7B8 | _Bk1Wk1B7B8 |
| [Pat04.xls]Demo!E2 | 10000 | | _Bk1Wk1E2F4 | _Bk1Wk1E2E4 |
| [Pat04.xls]Demo!E3 | 18000 | | _Bk1Wk1E2F4 | _Bk1Wk1E2E4 |
| [Pat04.xls]Demo!E4 | 24000 | | _Bk1Wk1E2F4 | _Bk1Wk1E2E4 |
| [Pat04.xls]Demo!B4 | #@B2@#+#@B3@# | B2,B3 | _Bk1Wk1B2B4 | |
| [Pat04.xls]Demo!B2 | 0.12 | | _Bk1Wk1B2B4 | |
| [Pat04.xls]Demo!B3 | 0.3 | | _Bk1Wk1B2B4 | |

Main Parent Stack

| Name | Parent Range |
|---|---|
| _Bk1Wk1I2I2 | [Pat04.xls]Demo!I2 |
| _Bk1Wk1I4I4 | [Pat04.xls]Demo!I4 |
| _Bk1Wk1B7B8 | [Pat04.xls]Demo!B7:B8 |

-continued

| Name | Parent Range |
|---|---|
| _Bk1Wk1E2F4 | [Pat04.xls]Demo!E2:F4 |
| _Bk1Wk1B2B4 | [Pat04.xls]Demo!B2:B4 |

Input Parent Stack

| Name | Input Range Range |
|---|---|
| _Bk1Wk1B7B8 | [Pat04.xls]Demo!B7:B8 |
| _Bk1Wk1E2E4 | [Pat04.xls]Demo!E2:E4 |

The next step of the system is to verify with the user which of the non-formulaic cells are inputs and which are constants. In the example provided herein, the system reviews the Formula Stack, and for each row having no Precedents, the system asks the user if the corresponding cell is an input. If so, the system optionally requests the user to enter the names to be used for the inputs. The system may also optionally request the user to enter the names to be used for the outputs. Note that requesting the names for the outputs may instead be performed at the beginning, when the user is prompted to select the desired outputs. The system updates the Input and Output Parent Stacks with the names entered by the user and fills in the variable type column with "String" or "Double" (note that this is for a Java servlet that may call the structured language model generated pursuant to the present invention). In our example, the Formula Stack and the Input and Output Parent Stacks look as follows after this step:

Formula Stack

| Cell | Formula | Precedents | Main Parent | Input/Output Parent |
|---|---|---|---|---|
| [Pat04.xls]Demo!I2 | NPV(#@B7@#,#@F2:F4@#) | B7,F2:F4 | _Bk1Wk1I2I2 | _PVofCash |
| [Pat04.xls]Demo!I4 | #@I2@#-#@B8@# | I2,B8 | _Bk1Wk1I4I4 | _NPVofInv |
| [Pat04.xls]Demo!B7 | 0.1 | | _Bk1Wk1B7B8 | _DiscRate |
| [Pat04.xls]Demo!F2 | #@E2@#*(1-#@$B$4@#) | E2,B4 | _Bk1Wk1E2F4 | |
| [Pat04.xls]Demo!F3 | #@E3@#*(1-#@$B$4@#) | E3,B4 | _Bk1Wk1E2F4 | |
| [Pat04.xls]Demo!F4 | #@E4@#*(1-#@$B$4@#) | E4,B4 | _Bk1Wk1E2F4 | |
| [Pat04.xls]Demo!B8 | 15000 | | _Bk1Wk1B7B8 | _InitInv |
| [Pat04.xls]Demo!E2 | 10000 | | _Bk1Wk1E2F4 | _EBITDA[0] |
| [Pat04.xls]Demo!E3 | 18000 | | _Bk1Wk1E2F4 | _EBITDA[1] |
| [Pat04.xls]Demo!E4 | 24000 | | _Bk1Wk1E2F4 | _EBITDA[2] |
| [Pat04.xls]Demo!B4 | #@B2@#+#@B3@# | B2,B3 | _Bk1Wk1B2B4 | |
| [Pat04.xls]Demo!B2 | 0.12 | | _Bk1Wk1B2B4 | |
| [Pat04.xls]Demo!B3 | 0.3 | | _Bk1Wk1B2B4 | |

Output Parent Stack

| Name | Output Parent Range | Type |
|---|---|---|
| _PvofCash | [Pat04.xls]Demo!I2 | Double |
| _NPVofInv | [Pat04.xls]Demo!I4 | Double |

Input Parent Stack

| Name | Input Parent Range | Type |
|---|---|---|
| _DiscRate | [Pat04.xls]Demo!B7 | Double |
| _InitInv | [Pat04.xls]Demo!B8 | Double |
| _EBITDA | [Pat04.xls]Demo!E2:E4 | Double |

The system next converts the formulas in the Formula Stack to their final form, specific to the target structured language, in this case Java, and figures out the calculation order for the cells. In the example embodiment provided herein, the system translates the Precedent ranges to their actual Parent equivalent, and adds the setVal( ), getval( ) and getArr( ) methods. Note that these methods are all part of a predefined class, "xlcV," which will accept strings, doubles and integers. The system uses a look-up matrix, which is a two-dimensional matrix, to determine the specific cell in the Main Parent Stack and follows it by an index representing the location of the cell in the parent range.

For example, in the 1st row, B7 would be converted to _Bk1Wk1B7B8[0][0].getVal( ). In the case of a multiple cell entry, the entire Parent Range needs to be referred to, followed by coordinates representing the begin and end points of the multi-dimensional array. For example, in the 1st row, F2:F4 becomes _Bk1Wk1E2F4.getArr( ),0,1,2,1. This denotes that within the rectangular array spanning from E2 to F4, retrieve the cells in coordinates (0,1)—first row, second column or cell F2—through coordinates (2,1)—third row, second column or cell F4. Thus, cells F2, F3 and F4 are indicated. Note that in the two-dimensional convention adopted in this example, coordinates (0,0) indicate first row, first column or the top left corner cell.

In the case of inputs, the Input Name is entered inside the setVal( ) method. Also, the system causes a copy of the input values to be placed in the Default Val column. In the case of outputs, the name to be used is entered in the Output Name column. Preferably, these methods are added to the formulas later, thereby allowing for easy conversion to Java or C. Alternatively, if desired, there can be two formula columns, 1 for the Java version and the other for the C version. Note that any formula which uses the OFFSET function needs to be adjusted so that its first argument is the entire parent range.

Starting from the first row of the Formula Stack, move any row above the current row that has an equivalent cell in the Precedents column below the current row. That is, look in the Cell column of the current row, I2 in our example, and then look for I2 in the precedents column. If a row below the current row has I2 in its precedents column, then move that row above the current row. Since the row with Cell I4 has I2 as a precedent, that row is moved above the row of Cell I2. This is for proper calculation order of the cells. The Formula Stack looks as follows after this step:

Formula Stack

| Cell | Formula | Precedents | Main Parent | Input/Output Parent | Default Value |
|---|---|---|---|---|---|
| [Pat04.xls]Demo!I4 | _Bk1Wk1I4I4[0][0].setVal(_Bk1Wk1I2I2[0][0].getVal()-_Bk1Wk1B7B8[1][0].getVal()); | I2,B8 | _Bk1Wk1I4I4 | _PVofCash | |
| [Pat04.xls]Demo!I2 | _Bk1Wk1I2I2[0][0].setVal(NPV(_Bk1Wk1B7B8[0][0].getVal,_Bk1Wk1E2F4.getArr(),0,1,2,1)); | B7,F2:F4 | _Bk1Wk1I2I2 | _NPVofInv | |
| [Pat04.xls]Demo!B7 | _Bk1Wk1B7B8[0][0].setVal(_DiscRate); | | _Bk1Wk1B7B8 | _DiscRate | 0.1 |
| [Pat04.xls]Demo!F2 | _Bk1Wk1E2F4[0][1].setVal(_Bk1Wk1E2F4[0][0].getVal()*(1-_Bk1Wk1B2B4[2][0].getVal())); | E2,B4 | _Bk1Wk1E2F4 | | |
| [Pat04.xls]Demo!F3 | _Bk1Wk1E2F4[1][1].setVal(_Bk1Wk1E2F4[1][0].getVal()*(1-_Bk1Wk1B2B4[2][0].getVal())); | E3,B4 | _Bk1Wk1E2F4 | | |
| [Pat04.xls]Demo!F4 | _Bk1Wk1E2F4[2][1].setVal(_Bk1Wk1E2F4[2][0].getVal()*(1-Bk1Wk1B2B4[2][0].getVal())); | E4,B4 | _Bk1Wk1E2F4 | | |
| [Pat04.xls]Demo!B8 | _Bk1Wk1B7B8[1][0].setVal(_InitInv); | | _Bk1Wk1B7B8 | _InitInv | 15000 |
| [Pat04.xls]Demo!E2 | _Bk1Wk1E2F4[0][0].setVal(_EBITDA[0]); | | _Bk1Wk1E2F4 | _EBITDA[0] | 10000 |
| [Pat04.xls]Demo!E3 | _Bk1Wk1E2F4[1][0].setVal(_EBITDA[1]); | | _Bk1Wk1E2F4 | _EBITDA[1] | 18000 |
| [Pat04.xls]Demo!E4 | _Bk1Wk1E2F4[2][0].setVal(_EBITDA[2]); | | _Bk1Wk1E2F4 | _EBITDA[2] | 24000 |
| [Pat04.xls]Demo!B4 | _Bk1Wk1B2B4[2][0].setVal(_Bk1Wk1B24[0][0].getVal()+_Bk1Wk1B2B4[1][0].getVal()); | B2,B3 | _Bk1Wk1B2B4 | | |
| [Pat04.xls]Demo!B2 | _Bk1Wk1B2B4[0][0].setVal(0.12); | | _Bk1Wk1B2B4 | | 0.12 |
| [Pat04.xls]Demo!B3 | _Bk1Wk1B2B4[1][0].setVal(0.30); | | _Bk1Wk1B2B4 | | 0.3 |

At this point, the system generates the actual code for the model, in this case in Java. While it should be apparent to one of ordinary skill in the art that several ways may be employed at this point by the system to generate the actual structured language model, the following steps are provided herein for exemplary purposes:

1) Create a new file to write the Java code in.
2) Write the class header using the Java class name provided by the user.
3) Go through the Input Parent Stack and write the "Input Declarations" section. Make sure to declare input arrays only once.
4) Go through the Output Parent Stack and write the "Output Declarations" section. Make sure to declare output arrays only once.
5) Write the method header using the name provided by the user.
6) Go through the Main Parent Stack and write the "Range Variable Declaration" section.
7) Go through the Formula Stack in reverse and write the "Actual Formulas" section using the Formula column.
8) Go through the Formula Stack and write the "Actual Outputs" section using the Input/Output Parent and Formula columns. In the Formula column, all that is needed is everything left of the 1st period. Alternatively, this could be a separate column in the stack
9) End the method with a bracket.
10) Write the Main method's header.
11) Declare a new instance of the class just created using the name the user provided, modified to avoid conflict. In this example, prefix the class name with an "A".
12) Go through the Formula Stack and write the "Set the Input arguments" section using the Input Name and Default Val columns.
13) Call the method for the class (i.e., Patent), provide the outputs to the screen and write the ending brackets.

For purposes of elucidation, it may make sense to think of the Formula Stack as a logical tree. For example, let's assume a spreadsheet employs the following formula: 5+3*(4+1). This formula is represented by the following logical tree:

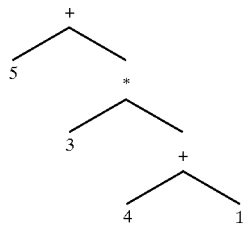

Calculations are performed going from bottom to top of this logical tree. Thus, the first function is the addition of 4 and 1. Next, this sum (i.e. 5) is multiplied to 3. Then this result (i.e. 15) is added to 5 to yield 20.

The system of the present invention includes a computer or a like device having a microprocessor and a storage unit. As used herein, "computer" is meant to be a broadly defined term which includes any device with an interface capable of carrying out algorithms. The computer also includes an input device for receiving user input, such as a mouse, keyboard, touch-screen display, voice-command unit, or the like. A software program for carrying out the steps of the present invention is preferably stored in the storage unit. This software program operates the microprocessor to carry out the steps of the invention.

The structured language model—such as in Java—generated by the system from a spreadsheet model can be provided interactively over the Internet without exposing the proprietary mathematical logic of the models. For example, the structured language model generated by the current system can be called by a Java servlet. A user can access the Java servlet over the World Wide Web via his computer, enter input values as prompted, and see the resulting outputs of the converted spreadsheet model, without referring to the original spreadsheet model.

What is claimed is:

1. A method for generating a structured programming language model from a spreadsheet model, the method requiring little to no knowledge of the structured programming language by a user and comprising:
    receiving, from the user via a computer input device, outputs of the spreadsheet model that the user desires;
    checking for errors in the user entries;
    if error is detected, then requesting corrected user entries,
    if no error is detected, then identifying relevant spreadsheet cells based on dependencies of the selected outputs;
    for each relevant cell identified, identifying and adding precedent cells to set of relevant cells,
    processing relevant formulas in the spreadsheet model for parsing;
    receiving, from the user via the computer input device, information about inputs of the spreadsheet model;
    converting the formulas into final form and determining calculation priority order; and
    generating the structured programming model, which structured programming model can be used without the spreadsheet model.

2. The method of claim 1, further comprising identifying parent ranges that are convertible into arrays.

3. The method of claim 1, wherein the structured programming language model is in Java code.

4. The method of claim 1, wherein the structured programming language model is in C code.

5. The method of claim 1, wherein the step of receiving the outputs of the spreadsheet model includes receiving, from the user via the computer input device, names for the outputs.

6. The method of claim 1, wherein the step of receiving the information about the inputs of the spreadsheet model includes receiving, from the user via the computer input device, names for the inputs.

7. The method of claim 1, wherein the set of relevant cells is stored in a stack format, the ordering of the relevant cells in the stack based on calculation priority.

8. The method of claim 1, wherein the structured programming language model is providable over the Internet without exposing the proprietary mathematical logic of the model.

9. A method of easily allowing a user of little or no programming language knowledge to convert a computerized spreadsheet model to a structured programming language model, the method comprising:
    receiving, from the user via a computer input device, outputs and inputs of the computerized spreadsheet model desired to be processed for conversion;
    checking the user entries for errors;
    if an error is found, then requesting corrected user entry;
    if no error is found, then identifying all relevant spreadsheet model cells based on the user entries;
    processing formulas used in the spreadsheet model for parsing;
    converting the formulas into final form and determining calculation priority order; and
    generating the structured programming language model, which structured programming model can be used without the spreadsheet model.

10. The method of claim 9, further comprising identifying parent ranges that are convertible into arrays.

11. The method of claim 9, wherein the structured programming language model is in Java code.

12. The method of claim 9, wherein the structured programming language model is in C code.

13. The method of claim 9, wherein the step of receiving the outputs and the inputs of the computerized spreadsheet model includes receiving names for the outputs and inputs.

14. The method of claim 9, further comprising the step of storing relevant spreadsheet model cells in a stack format, the ordering of the relevant cells in the stack based on calculation priority.

15. The method of claim 9, wherein the structured programming language model is providable without exposing the proprietary mathematical logic of the model.

16. The method of claim 9, wherein the structured programming language model is providable over the Internet without exposing the proprietary mathematical logic of the model.

17. A system for easily allowing a user of little or no programming language knowledge to convert a computerized spreadsheet model to a structured programming language model, the system comprising:

a computer having a user interface, a microprocessor and a storage unit;

an input device electronically coupled to the computer;

a software program stored in the storage unit, the software program being programmed to operate the microprocessor for:

requesting the user, via the user interface, and receiving from the user, via the input device, outputs and inputs of the computerized spreadsheet model desired to be processed for conversion;

checking the user entries for errors;

if an error is found, then requesting, via the user interface, corrected user entry;

if no error is found, then identifying all relevant spreadsheet model cells based on the user entries;

processing formulas used in the spreadsheet model for parsing;

converting the formulas into final form and determining calculation priority order; and generating the structured programming language model, which structured programming model can be used without the spreadsheet model.

18. The system of claim 17, wherein the software program is further programmed to operate the microprocessor for identifying parent ranges that are convertible into arrays.

19. The system of claim 17, wherein the structured programming language model is in Java code.

20. The system of claim 17, wherein the structured programming language model is in C code.

21. The system of claim 17, further comprising a second computer that can access the computer over a telecommunication link, the second computer storing the computerized spreadsheet model that is converted by the software program operating on the computer.

22. The method of claim 1, wherein the structured programming model that is generated can be used on a computer other than a computer on which the spreadsheet model was developed.

23. The method of claim 22, wherein the structured programming model that is generated can be used with an operating system other than an operating system with which the spreadsheet model was developed.

24. The method of claim 9, wherein the structured programming model that is generated can be used on a computer other than a computer on which the spreadsheet model was developed.

25. The method of claim 24, wherein the structured programming model that is generated can be used with an operating system other than an operating system with which the spreadsheet model was developed.

26. The system of claim 16, wherein the structured programming model that is generated can be used on a computer other than a computer on which the spreadsheet model was developed.

27. The system of claim 26, wherein the structured programming model that is generated can be used with an operating system other than an operating system with which the spreadsheet model was developed.

* * * * *